US006933042B2

(12) United States Patent
Gill

(10) Patent No.: US 6,933,042 B2
(45) Date of Patent: Aug. 23, 2005

(54) BALLISTIC GMR STRUCTURE USING NANOCONSTRUCTION IN SELF PINNED LAYERS

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 102 days.

(21) Appl. No.: 10/631,997

(22) Filed: Jul. 30, 2003

(65) Prior Publication Data

US 2005/0024787 A1 Feb. 3, 2005

(51) Int. Cl.$^7$ .............................................. G11B 5/127
(52) U.S. Cl. ................. 428/213; 428/692; 360/324.11; 360/324.12
(58) Field of Search .............................. 428/213, 692; 360/324.11, 324.12

(56) References Cited

U.S. PATENT DOCUMENTS

| 5,695,864 | A | 12/1997 | Slonczewski | 428/212 |
|---|---|---|---|---|
| 5,936,402 | A | 8/1999 | Schep et al. | 324/252 |
| 6,187,458 | B1 | 2/2001 | Hashizume et al. | 428/692 |
| 6,411,478 | B1 | 6/2002 | Mao et al. | 360/324.2 |
| 6,462,919 | B1 * | 10/2002 | Mack et al. | 360/327.3 |
| 6,560,077 | B2 | 5/2003 | Fujiwara et al. | 360/324.1 |
| 6,794,697 | B1 * | 9/2004 | Sharma | 257/295 |
| 6,807,033 | B2 * | 10/2004 | Zhu | 360/324 |
| 2002/0036876 | A1 | 3/2002 | Kawawake et al. | 360/324.1 |
| 2004/0095690 | A1 * | 5/2004 | Beach | 360/324.1 |
| 2004/0141261 | A1 * | 7/2004 | Hasegawa et al. | 360/324.11 |
| 2004/0160708 | A1 * | 8/2004 | Zheng et al. | 360/324.12 |
| 2004/0169963 | A1 * | 9/2004 | Okuno et al. | 360/324.1 |

FOREIGN PATENT DOCUMENTS

| JP | 2003-8105 | 1/2003 | H01L/43/08 |
|---|---|---|---|
| WO | 02/095434 | 11/2002 | G01R/33/09 |

OTHER PUBLICATIONS

Ferreira, M.S.; "Enhanced Magnetoresistance and Spin–Filter Effects in Magnetic Heterostructures", J. Phys.: Condens, Matter 12 (2000) L373–L378, 2000.

Munoz, M.; "Ballistic Magnetoresistance in a Nanocontact Between a Ni Cluster and a Magnetic Thin Film", Applied Physics Letters, vol. 79, No. 18, Oct. 29, 2001.

Zhao, Y. W; "From Ballistic to Non–Ballistic Magnetoresistance in Nanocontacts: Theory and Experiments", Journal of Magnetism and Magnetic Materials 223 (2001) 169–174, 2001.

Garcia, N.; "Ballistic Magnetoresistance in different Nanocontact Configurations: a Basis for Future magnetoresistance Sensors", Journal of Magnetism and Magnetic Materials 240 (2002) 92–99, 2002.

Chopra, H.; "Ballistic Magnetoresistance Over 300% in Ni Nanocontacts at Room Temperaturs", The American Physical Society, Physical Review B 66, 020403 (R) (2002).

Price, E.; "Magnetoresistance in Ballistic Transport Devices," Center for Magnetic Recording Research.

* cited by examiner

Primary Examiner—Kevin M. Bernatz
(74) Attorney, Agent, or Firm—Zilka-Kotab, PC

(57) ABSTRACT

A magnetic head having a pinned area, a free area, and a nanoconstricted area encompassing portions of the pinned and free areas. A first layer of magnetic material extends along the pinned and free areas. An AP coupling layer extends along the pinned area. A third layer of magnetic material is positioned above the AP coupling layer, an active portion of the third layer extending along the pinned area but not along the free area. The first and third layers have magnetic moments that are self-pinned antiparallel to each other in the pinned area and a portion of the nanoconstricted area encompassing the pinned area.

32 Claims, 6 Drawing Sheets

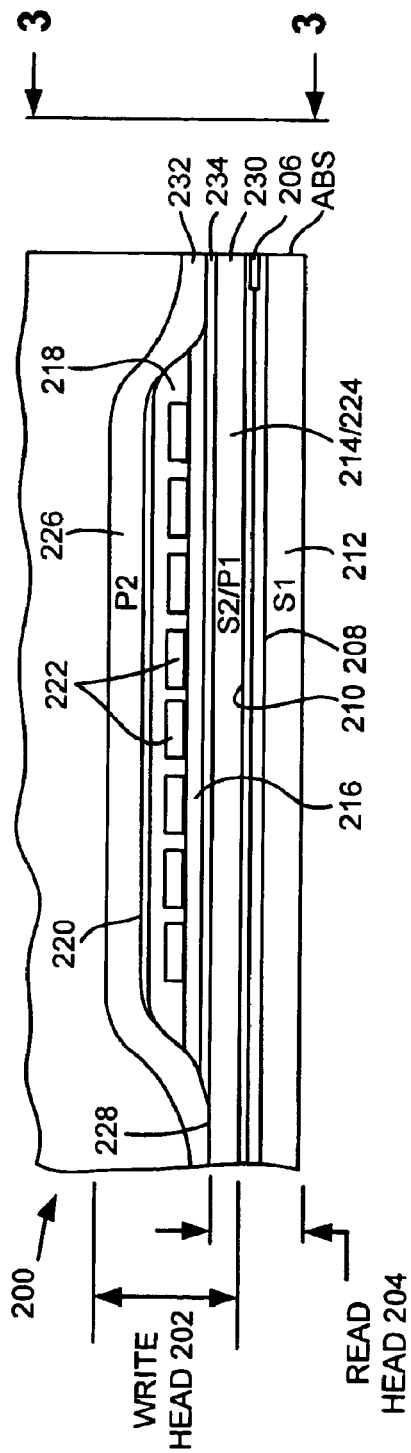
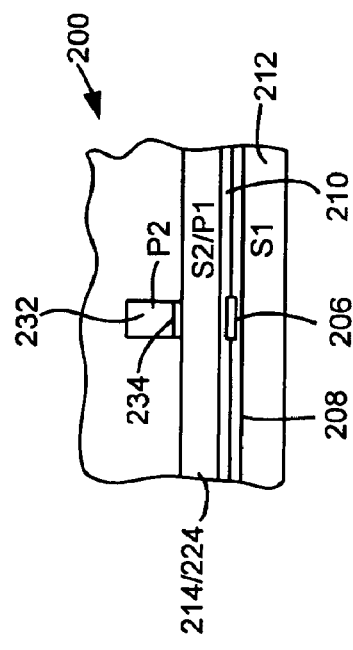
FIG. 2
FIG. 3

BALLISTIC GMR STRUCTURE USING NANOCONSTRUCTION IN SELF PINNED LAYERS

FIELD OF THE INVENTION

The present invention relates to magnetic heads, and more particularly, this invention relates to application of ballistic magnetoresistance in a magnetic sensor.

BACKGROUND OF THE INVENTION

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field).

The discovery of GMR has spurred a body of investigations on magnetotransport properties in different sample systems. One such area of investigation has led to the development of ballistic magnetoresistance (BMR) structures that may be useful in applications relating to disk drive systems, e.g., spin valve devices. At room temperature and low applied fields (<100 Oe) very large BMR values, larger than 300% over GMR values, can be achieved in metallic nanocontacts of a few atoms size. More detail on the theory behind BMR is provided in articles entitled "Ballistic magnetoresistance in different nanocontact configurations: a basis for future magnetoresistance sensors", N. Garcia et al., Journal of Magnetism and Magnetic Materials 240 (2002), pp. 92–99; and "From ballistic to non-ballistic magnetoresistance in nanocontacts: theory and experiments", Y.-W Zhao et al, Journal of Magnetism and Magnetic Materials 223 (2001), pp. 169–174. These articles and all documents referenced therein are herein incorporated by reference.

What is needed is a practical application of BMR into a magnetic sensor that can be used with disk drive systems.

SUMMARY OF THE INVENTION

The present invention provides a practical application of BMR by providing a magnetic head having a pinned area, a free area, and a nanoconstricted area encompassing portions of the pinned and free areas. A first layer of magnetic material extends along the pinned and free areas. An AP coupling layer extends along the pinned area. A third layer of magnetic material is positioned above the AP coupling layer, an active portion of the third layer extending along the pinned area but not along the free area. The first and third layers have magnetic moments that are self-pinned antiparallel to each other in the pinned area and a portion of the nanoconstricted area encompassing the pinned area.

A preferred height of the nanoconstricted area is less than about 100 nanometers. In one embodiment, the third layer has been removed from the free area such as by etching or milling. In another embodiment, a portion of the third layer in the free area has been rendered nonmagnetic, such as by oxidation. As an option, a hard bias layer can be positioned outside the free area for stabilizing the first layer in the free area. A preferred material for the first layer includes NiFe. A preferred material for the third layer includes CoFe. A preferred material for the AP coupling layer includes Ru.

In further embodiments, the nanoconstricted area may encompass a greater portion of the pinned area or the free area.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 1 is a simplified drawing of a magnetic recording disk drive system.

FIG. 2 is a partial view of the slider and a merged magnetic head.

FIG. 3 is a partial air bearing surface (ABS) view, not to scale, of the slider taken along plane 3—3 of FIG. 2 to show the read and write elements of the merged magnetic head.

FIG. 4 is a top view, not to scale, of a ballistic GMR sensor structure.

FIG. 5 is an ABS illustration of the sensor structure of FIG. 4, not to scale, taken along plane 5—5 of FIG. 4, according to one embodiment of the present invention.

FIG. 6 is an ABS illustration of another sensor structure, not to scale, according to an embodiment of the present invention.

FIG. 7 illustrates the effect of oppositely oriented magnetizations at a junction between free and pinned areas of a ballistic GMR sensor structure.

FIG. 8 illustrates the effect of parallel oriented magnetizations at a junction between free and pinned areas of a ballistic GMR sensor structure.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

In the following description, the width of the layers (W) refers to the track width. The sensor height is in a direction into the face of the paper in an ABS view. Unless otherwise described, thicknesses of the individual layers are taken perpendicular to the plane and height of the associated layer and are provided by way of example only and may be larger and/or smaller than those listed. Similarly, the materials listed herein are provided by way of example only, and one skilled in the art will understand that other materials may be used without straying from the spirit and scope of the present invention. Conventional processes can be used to form the structures except where otherwise noted.

Figure 1:
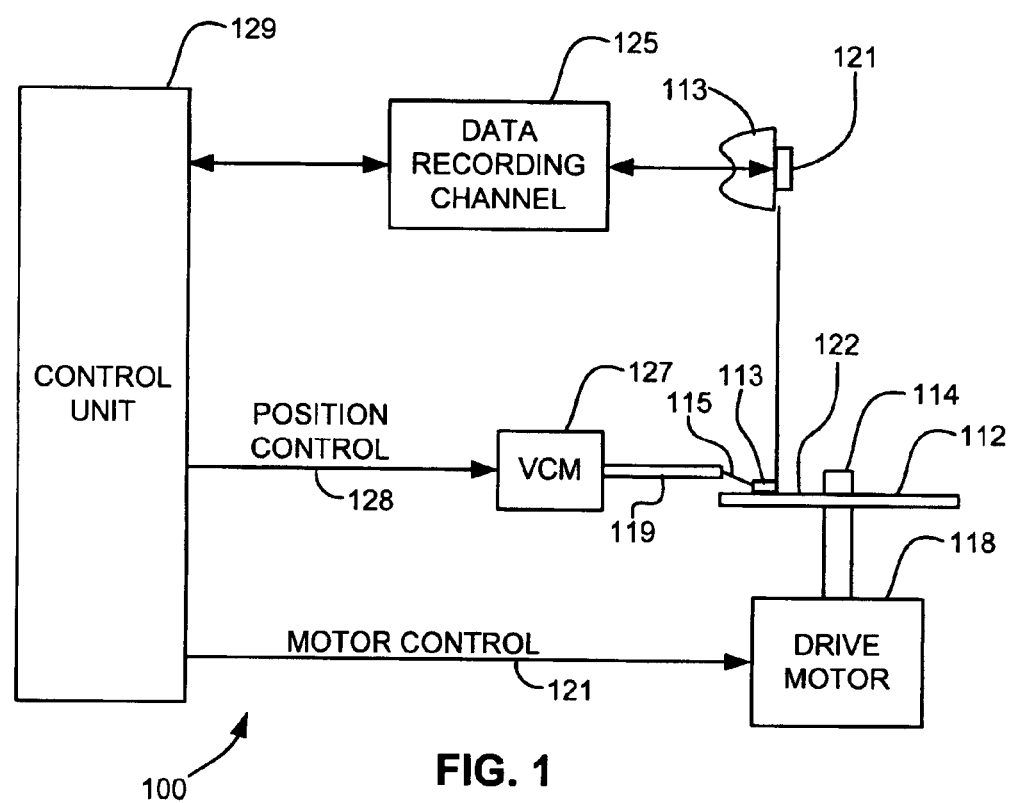

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on disk 112.

At least one slider 113 is positioned near the disk 112, each slider 113 supporting one or more magnetic read/write heads 121. More information regarding such heads 121 will be set forth hereinafter during reference to the remaining figures. As the disks rotate, slider 113 is moved radially in and out over disk surface 122 so that heads 121 may access different tracks of the disk where desired data are recorded. Each slider 113 is attached to an actuator arm 119 by means way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

FIG. 2 is a side cross-sectional elevation view of a merged magnetic head 200, which includes a write head portion 202 and a read head portion 204, the read head portion employing a dual spin valve sensor 206 of the present invention. FIG. 3 is an ABS view of FIG. 2. The spin valve sensor 206 is sandwiched between nonmagnetic electrically insulative first and second read gap layers 208 and 210, and the read gap layers are sandwiched between ferromagnetic first and second shield layers 212 and 214. In response to external magnetic fields, the resistance of the spin valve sensor 206 changes. A sense current ($I_S$) conducted through the sensor causes these resistance changes to be manifested as potential changes. These potential changes are then processed as readback signals by the processing circuitry 329 shown in FIG. 1.

The write head portion 202 of the magnetic head 200 includes a coil layer 222 sandwiched between first and second insulation layers 216 and 218. A third insulation layer 220 may be employed for planarizing the head to eliminate ripples in the second insulation layer caused by the coil layer 222. The first, second and third insulation layers are referred to in the art as an "insulation stack". The coil layer 222 and the first, second and third insulation layers 216, 218 and 220 are sandwiched between first and second pole piece layers 224 and 226. The first and second pole piece layers 224 and 226 are magnetically coupled at a back gap 22° and have first and second pole tips 230 and 232 which are separated by a write gap layer 234 at the ABS. Since the second shield layer 214 and the first pole piece layer 224 are a common layer this head is known as a merged head. In a piggyback head an insulation layer is located between a second shield layer and a first pole piece layer. First and second solder connections (not shown) connect leads (not shown) from the spin valve sensor 206 to leads (not shown) on the slider 313 (FIG. 1), and third and fourth solder connections (not shown) connect leads (not shown) from the coil 222 to leads (not shown) on the suspension.

As described above, at low applied fields (<100 Oe) very large BMR values, larger than 300% over GMR values, can be achieved in metallic nanocontacts of a few atoms size. This phenomenon is known as ballistic GMR.

Figure 4:
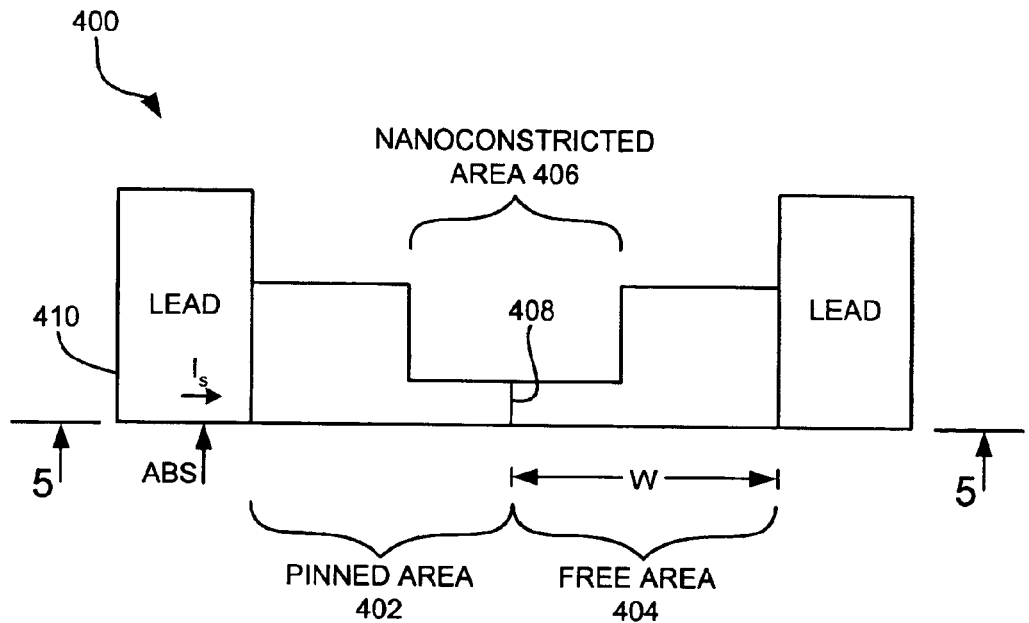

FIG. 4 illustrates a ballistic GMR structure 400 that can be used as a reading sensor in a disk drive. As shown in FIG. 4, the structure 400 includes a head having a pinned area 402, a free area 404, and a nanoconstricted area 406 encompassing portions of the pinned and free areas. The free area 404 defines the track width W. A junction 408 is defined in the nanoconstricted area at the position where the pinned and free areas 402, 404 meet. Leads 410 are formed on opposite sides of the sensor stack to pass the sensing current $I_S$ through the sensor.

Figure 5:
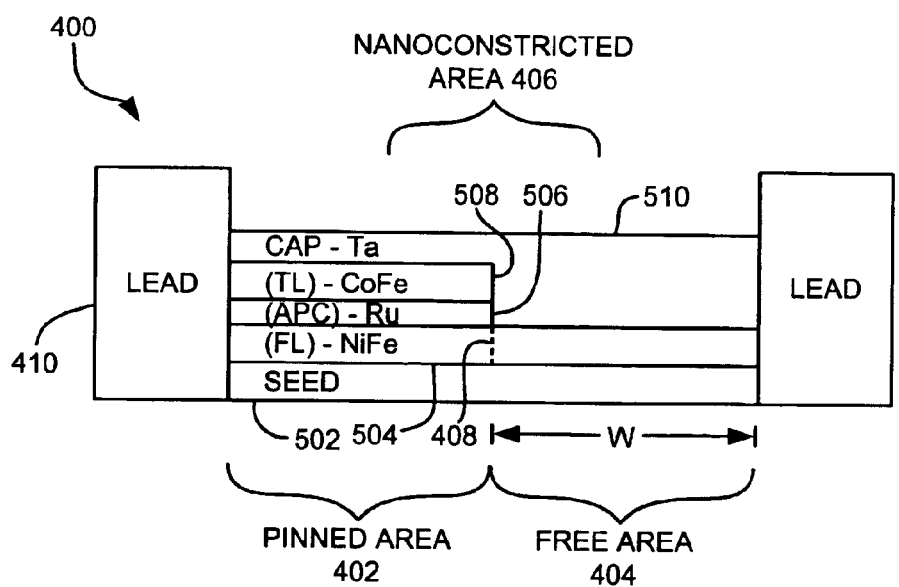

FIG. 5 is an ABS view of the structure 400 of FIG. 4. As shown, a seed layer (SEED) 502 is formed. A first layer (FL) 504 of magnetic material extends along the pinned and free areas 402, 404 of the structure 400. An AP coupling layer (APC) 506 extends along the pinned area 402, preferably only to the junction 408 of the pinned and free areas 402, 404. A third layer (TL) 508 of magnetic material is formed above the AP coupling layer 506. A cap (CAP) 510 is formed above the third layer 508. Preferred materials from which the first layer 504 may be constructed include NiFe, CoFe, Co, etc. Preferred materials from which the third layer 508 may be constructed include NiFe, CoFe, Co, etc. The AP coupling layer 506 is preferably constructed of Ru. The seed layer 502 and cap 510 can be formed of conventional materials.

The first and third layers 504, 508 have magnetic moments that are self-pinned antiparallel to each other in the pinned area 402 and the portion of the nanoconstricted area 406 encompassing the pinned area 402. The self-pinning is caused by large antiparallel exchange coupling between the first and third layers 504, 508 and perpendicular magnetic anisotropy, causing the magnetizations of the first and third layers 504, 508 to be oriented perpendicular to the ABS and antiparallel to each other.

Figure 6:
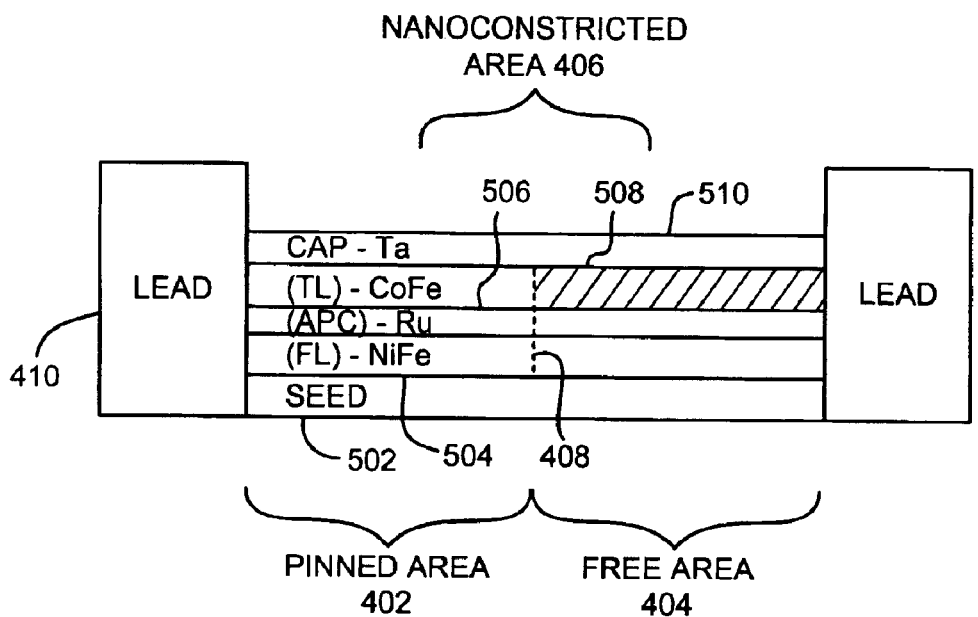

The active portion of the third layer 508 extends along the pinned area 402 but not along the free area 404, i.e., is absent from or inactive in the free area 404. In the embodiment shown in FIG. 5, the third layer 508 has been removed from the free area 404 such as by etching or milling. FIG. 6 depicts an alternate embodiment in which the portion of the third layer 508 in the free area 404 has been rendered nonmagnetic, such as by oxidation. The result in either of these cases is that the magnetic moment of the first layer 504 in the free area 404 is not constrained by the third layer 508 but is free to rotate as magnetic fields are applied, such as from the fields imposed by a magnetic disk passing nearby. The rotation of the magnetic moment of the first layer 504 in the free area 404 creates variations in the signal, as will be described in detail below.

Figure 7:
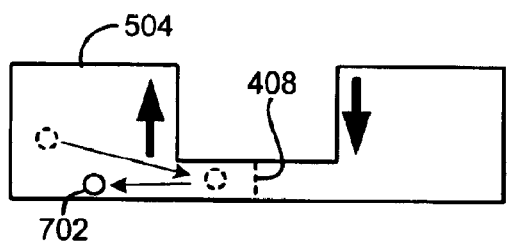
Figure 8:
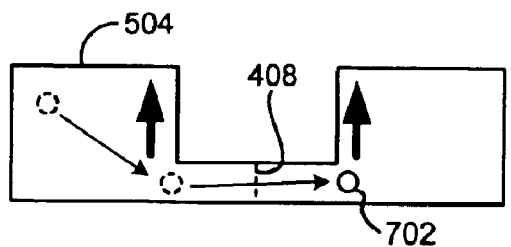

FIGS. 7 and 8 are detailed illustrations of the junction 408 at the first layer 504. As shown, the junction 408 is a nanocontact region between the pinned and free areas 402, 404. As shown in FIG. 7, when the magnetization at the two sides of the nanocontact is antiparallel, a domain wall is formed at the junction 408. The polarized electrons 702 will not be able to adiabatically traverse the very sharp wall and will suffer from very strong scattering, resulting in higher resistance. However, as shown in FIG. 8, if the magnetization at the two sides of the nanocontact are parallel, the electrons with the same spin can accommodate themselves at both sides of the nanocontact, i.e., they do not suffer domain wall scattering. The difference of the resistance in the two magnetization configurations gives rise to the observed large magnetoresistance. In other words, the large values of BMR are obtained when the value $r=D\uparrow/D\downarrow$ (where $D\uparrow$ and $D\downarrow$ are respectively the majority and minority density of states at the Fery level) is large (density of states condition) and the electrons are ballistic, $b=\lambda/l<1$, where $\lambda$ and l are the domain wall width or thickness of magnetic boundaries and the mean free pack for spin reversal (ballistic non-adiabatic condition). The two conditions should be satisfied in order to have large values of BMR. For example, r=12 and 10 for Ni and Co and 3 for Fe and they have similar values for b.

Thus, to get the high resistance from the domain wall, very small dimensions in the nanoconstricted area 406 are required. The preferred height and thickness of the nanoconstricted area 406 is less than about 100 nanometers, more preferably less than about 50 nanometers, and ideally between about 10 and 30 nanometers. Note however, that if the height and/or thickness of the nanoconstricted area 406 is too thin, the current will damage or "burn up" the nanoconstricted area 406 so a designer should not stray far from the dimensions provided herein.

Figure 9:
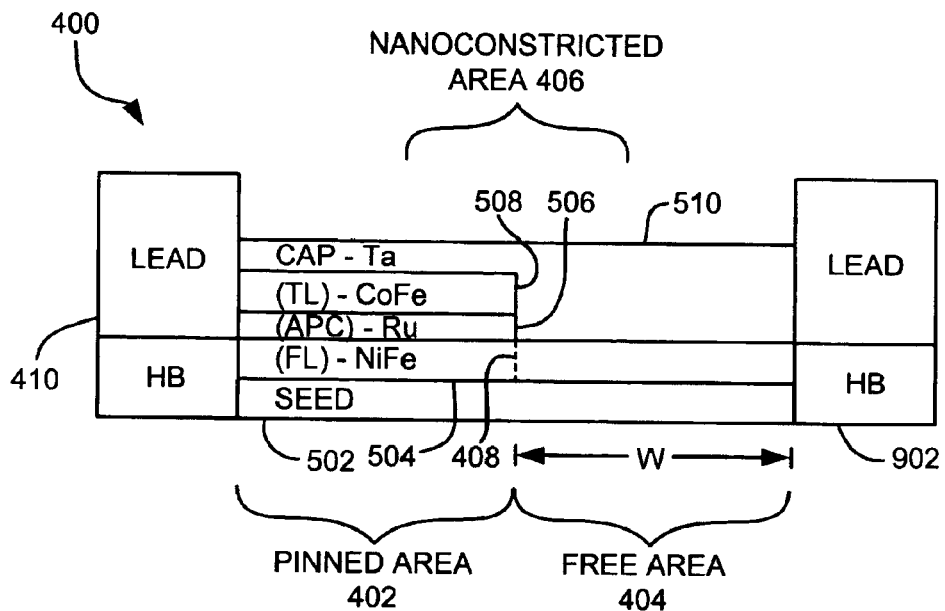
FIG. 9 is an ABS illustration of the sensor structure, not to scale, according to another embodiment of the present invention.

FIG. 9 illustrates a variation of the embodiment shown in FIG. 5. In the embodiment shown in FIG. 9, a hard bias layer (HB) 902 is positioned outside the free area 404 for stabilizing the first layer 504 in the free area 404. A hard bias layer 902 may also be provided outside the pinned area 402.

Figure 10:
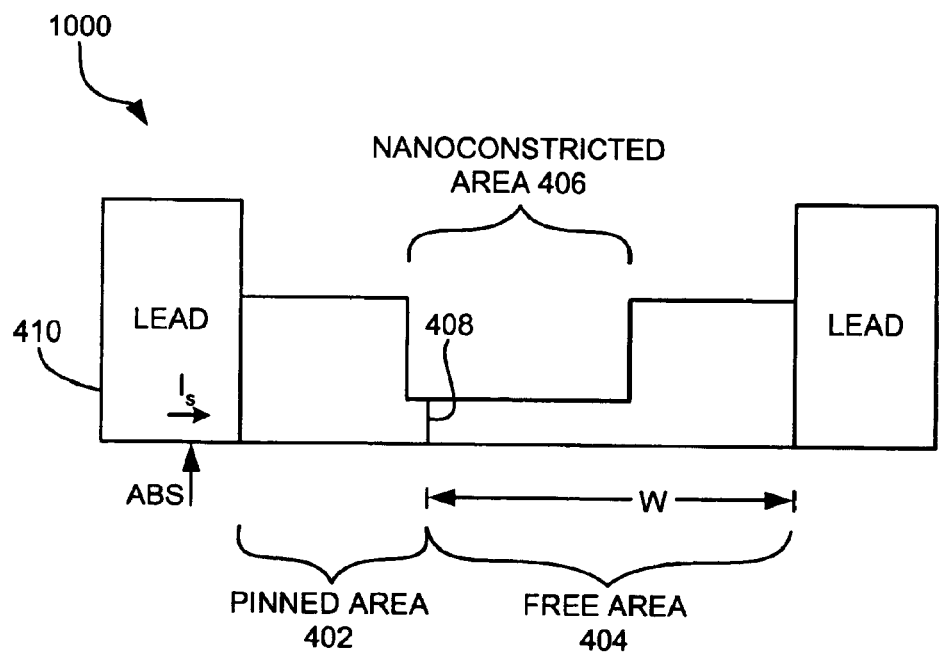
FIG. 10 is a top view of a ballistic GMR sensor structure, not to scale, according to another embodiment.
Figure 11:
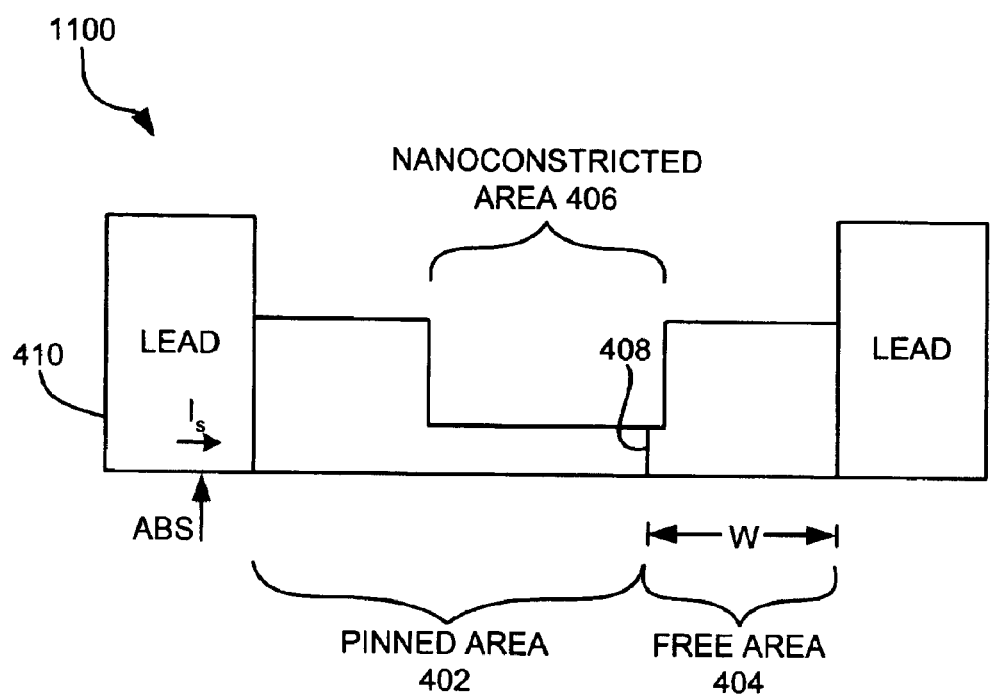
FIG. 11 is a top view of a ballistic GMR sensor structure, not to scale, according to yet another embodiment.

FIG. 10 depicts a ballistic GMR 1000 according to another embodiment. In this embodiment, the junction 408 is formed nearer to the pinned area 402. FIG. 11 depicts another ballistic GMR structure 1100. In this embodiment, the junction 408 is formed nearer to the free area 404.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head having a pinned area and a free area, adjacent to each other in a track width direction wherein a nanoconstricted area is defined as the area encompassing portions of the pinned and free areas, at the junction of the pinned and free areas the head comprising:

a first layer of magnetic material extending along the pinned and free areas;

an AP coupling layer extending along the pinned area; and a third layer of magnetic material, an active portion of the third layer extending along the pinned area but not along the free area;

wherein the first and third layers have magnetic moments that are self-pinned antiparallel to each other in the pinned area and the portion of the nanoconstricted area within the pinned area; such that the magnetic moment of the first layer in the free area is free to rotate as magnetic fields are applied wherein said portions of the pinned and free areas within the nanoconstricted area have a height that is less than the height of the portions of pinned and free areas outside the nanoconstricted area.

2. A head as recited in claim 1, wherein a height of the nanoconstricted area is less than about 100 nanometers.

3. A head as recited in claim 1, wherein a height of the nanoconstricted area is less than about 50 nanometers.

4. A head as recited in claim 1, wherein a height of the nanoconstricted area is about 10 to 30 nanometers.

5. A head as recited in claim 1, wherein the third layer has been removed from the free area by at least one of etching and milling.

6. A head as recited in claim 1, wherein a portion of the third layer in the free area has been rendered nonmagnetic.

7. A head as recited in claim 6, wherein the portion of the third layer in the free area has been rendered nonmagnetic by oxidation.

8. A head as recited in claim 1, wherein the first layer includes NiFe.

9. A head as recited in claim 1, wherein the third layer includes CoFe.

10. A head as recited in claim 1, wherein the AP coupling layer includes Ru.

11. A head as recited in claim 1, wherein a junction of the free and pinned areas is positioned in the nanoconstricted area, wherein the junction is positioned more towards the pinned area relative to a center of the nanoconstricted area.

12. A head as recited in claim 1, wherein a junction of the free and pinned areas is positioned in the nanoconstricted area, wherein the junction is positioned more towards the free area relative to a center of the nanoconstricted area.

13. A magnetic storage system, comprising:
magnetic media;
at least one head for reading from and writing to the magnetic media, each head having:
a sensing element having the structure recited in claim 1;
a write element coupled to the sensor;
a slider for supporting the head; and
a control unit coupled to the head for controlling operation of the head.

14. A magnetic head having a pinned areas and, a free area, adjacent to each other in a track width direction wherein a nanoconstricted area is defined as the area encompassing a portion of the free area and a portion of the pinned area, adjacent the junction of the pinned and free areas, wherein the nanoconstricted area encompasses a greater portion of the pinned the head comprising:
a first layer of magnetic material extending along the pinned and free areas;
an AP coupling layer extending along the pinned area; and
a third layer of magnetic material extending along the pinned area but not into the free area;
wherein the first and third layers have magnetic moments that are self-pinned antiparallel to each other in the pinned area and the nanoconstricted area; such that the magnetic moment of the first layer in the free area is free to rotate as magnetic fields are applied
wherein said portions of the pinned and free areas within the nanoconstricted area have height that is less than the height of the portions of pinned and free areas outside the nanoconstricted area.

15. A head as recited in claim 14, wherein a height of the nanoconstricted area is less than about 100 nanometers.

16. A head as recited in claim 14, wherein a height of the nanoconstricted area is less than about 50 nanometers.

17. A head as recited in claim 14, wherein a height of the nanoconstricted area is about 10 to 30 nanometers.

18. A head as recited in claim 14, wherein the third layer has been removed from the free area by at least one of etching and milling.

19. A head as recited in claim 14, wherein a junction of the free and pinned areas is positioned in the nanoconstricted area, wherein the junction is positioned more towards the free area relative to a center of the nanoconstricted area.

20. A head as recited in claim 14, wherein the first layer includes NiFe.

21. A head as recited in claim 14, wherein the third layer includes CoFe.

22. A head as recited in claim 14, wherein the AP coupling layer includes Ru.

23. A magnetic head having a pinned area, and a free area, adjacent to each other in a track width direction wherein a nanoconstricted area, is defined as the area encompassing a portion of the pinned area and a portion of the free area, adjacent the junction of the pinned and free areas, wherein the nanoconstricted area encompasses a greater portion of the free area
the head comprising:
a first layer of magnetic material extending along the pinned and free areas;
an AP coupling layer extending along the pinned area; and
a third layer of magnetic material extending along the pinned area but not into the free area;
wherein the first and third layers have magnetic moments that are self-pinned antiparallel to each other in the pinned area; such that the magnetic moment of the first layer in the free area is free to rotate as magnetic fields are applied
wherein said portions of the pinned and free areas within the nanoconstricted area have a height that is less than areas immediately the height of the portions of pinned and free areas outside the nanoconstricted area.

24. A head as recited in claim 23, wherein a height of the nanoconstricted area is less than about 100 nanometers.

25. A head as recited in claim 23, wherein a height of the nanoconstricted area is less than about 50 nanometers.

26. A head as recited in claim 23, wherein a height of the nanoconstricted area is about 10 to 30 nanometers.

27. A head as recited in claim 23, wherein the third layer has been removed from the free area by at least one of etching and milling.

28. A head as recited in claim 23, wherein a junction of the free and pinned areas is positioned in the nanoconstricted area, wherein the junction is positioned more towards the pinned area relative to a center of the nanoconstricted area.

29. A head as recited in claim 23, wherein the first layer includes NiFe.

30. A head as recited in claim 23, wherein the third layer includes CoFe.

31. A head as recited in claim 23, wherein the AP coupling layer includes Ru.

32. A magnetic head having a pinned area, a free area, and a nanoconstricted area encompassing portions of the pinned and free areas, the head comprising:
a first layer of magnetic material extending along the pinned and free areas;
an AP coupling layer extending along the pinned area; and
a third layer of magnetic material, an active portion of the third layer extending along the pinned area but not along the free area;
a hard bias layer positioned outside the free area for stabilizing the first layer in the free area;
wherein the first and third layers have magnetic moments that are self-pinned antiparallel to each other in the pinned area and a portion of the nanoconstricted area encompassing the pinned area.

* * * * *

UNITED STATES PATENT AND TRADEMARK OFFICE
CERTIFICATE OF CORRECTION

PATENT NO. : 6,933,042 B2
DATED : August 23, 2005
INVENTOR(S) : Gill

It is certified that error appears in the above-identified patent and that said Letters Patent is hereby corrected as shown below:

Column 6,
Line 25, after "free area" remove the comma ",";
Line 28, after "free areas" remove the comma ",";
Line 29, after "free areas" insert -- , --;

Column 7,
Line 18, after "areas and" remove the comma ",";
Line 22, after "area" remove the comma ",";
Line 24, after "pinned" insert -- area --;
Line 37, after "areas have" insert -- a --;
Line 59, after "pinned area" remove the comma ",";
Line 59, after "free area" remove the comma ",";
Line 60, after "direction" insert -- , --;

Column 8,
Line 1, after "nanoconstricted area" remove the comma ",";
Line 3, after "free areas" remove the comma ",";
Line 5, after "free area" insert -- , --;
Line 5, before "the height" delete "areas immediately";
Line 16, after "pinned area" remove the semicolon ";";
Line 18, after "applied" insert -- ; --.

Signed and Sealed this

Twenty-fifth Day of October, 2005

JON W. DUDAS
*Director of the United States Patent and Trademark Office*